United States Patent Office 2,846,311
Patented Aug. 5, 1958

2,846,311

MANUFACTURE OF IMPROVED DOUGHNUT SUGAR AND THE RESULTING PRODUCT

George Jesse Rosner, Englewood, N. J., assignor to The Griffith Laboratories, Inc., Chicago, Ill., a corporation of Illinois No Drawing. Application December 4, 1956
Serial No. 626,095

9 Claims. (Cl. 99—92)

The present invention relates generally to sugar compositions for covering bakery goods, such as cakes and doughnuts, and to methods of producing the same.

Such dusting sugars are commonly designated as doughnut sugar, although they are also used on other goods. The requirements for use on doughnuts are the more exacting, because of dusting machines which are extensively used. Hence, the present invention is described by particular reference to doughnut sugar.

Doughnut sugar is commonly composed of crystals of sugar in large quantity and normally solid edible fat in small quantity, with or without starch in small quantity. The sugar and starch contribute whiteness to coated doughnuts. The sugar imparts sweetness. The starch functions primarily in mechanical applications to doughnuts. The fat binds the sugar and starch to the doughnut, and additionally serves as a moisture-barrier coating for individual sugar crystals to prevent deliquescence.

The term "fat" as used throughout the specification and claims is intended to include any and all edible natural and processed animal and vegetable fats and oils, and any and all shortenings whether natural, hydrogenated or rearranged fats and oils, with or without added emulsifiers and other modifiers, and mixtures of any of the foregoing.

Practically, about 7.5% by weight has been the upper limit for fat content. Above that amount, the composition has over-slip; it does not adhere well to the doughnut; and it does not move satisfactorily through the sugaring machine. This over-slip, due to the presence of fat, is the tendency of the composition to slide off a perforated drum through which it should enter to snow upon doughnuts tumbled in the drum. Starch is commonly used in amount from 5% to 20% of the composition to avoid over-slip. Raising starch content and lowering content of fat contribute to the avoidance of over-slip.

Doughnut sugars lacking less than 5% of starch easily slip off the doughnut and are not adaptable for certain machine applications. They have over-slip. Disadvantages of starch are the reduction in sweetness and a starchy taste.

The present invention is based upon discovery of a substitute for starch in a doughnut sugar, which in small quantity is as effective as a large quantity of starch, and which may be used in place of some or all of the starch.

It is the general object of the invention to produce an improved and sweeter dusting sugar.

It is a particular object to produce a doughnut sugar having adherence to doughnuts and lacking over-slip.

It is a particular object of the invention to increase the combined content of fat and sugar in a doughnut sugar lacking over-slip by use of a small but effective quantity of a new anti-over-slip agent as a substitute for a much larger amount of starch.

Various other and ancillary objects and advantages of the invention will become apparent from the following description and explanation of the invention.

Experimentally, in attempts to improve the distribution of fat in doughnut sugars, one was made with a view to substituting an equal weight of kaolin for starch, by a formulation as follows:

|  | Parts |
| --- | --- |
| Fat | 6 |
| Dextrose | 82 |
| Kaolin | 7 |

The sugar had excellent smoothness in covering doughnuts, which is evidence of good distribution of fat. However, the taste was adversely "off" with "clay" flavor, and the kaolin absorbed too much fat from the doughnut, causing discoloration of the doughnut sugar on the doughnut, in part due to the discoloration of the residual frying fat in the doughnut.

Omitting the clay destroyed the smooth covering power. By omitting starch and limiting the amount of kaolin, it was discovered that up to 1.5% content of kaolin, the taste was not adversely affected, and the absorption of fat from the doughnut was not noticeable, and that with a content of kaolin below 0.5%, the benefits of the kaolin were not evident. Furthermore, it was discovered that within this range from 0.5% to 1.5%, the doughnut sugar with no starch lacked over-slip, thus making it useful and desirable for machine-application to doughnuts.

Accordingly, for producing dusting sugars sweeter than conventional doughnut sugars, the startch content is reduced by omitting some or all of it, and for the function of the omitted starch as exerted in doughnut sugars, a small amount of kaolin is used in substitution.

Because kaolin readily absorbs fat it is preferred to mix the sugar, or the sugar and starch, with all, or substantially all, the fat before adding the kaolin. In practice, the sugar with or without starch is mixed with a solid fat, or a mixture of solid fat, or fat and liquid oil mixtures. Sometimes normally solid fat in its melted state is sprayed on the sugar, or on the sugar and starch, and the entire mass is thoroughly mixed. For this practice in the present invention, the kaolin is then added.

Edible kaolin of high white color is used and those grades meeting the standards of National Formulary IX are preferred. The preferred grades are those characterized in size distribution as follows:

| Under 2 microns | At least 75% |
| --- | --- |
| Under 1 micron | At least 45% |
| Over 10 microns | Not over 0.5% |

It is well known that coarse dextrose particles in a doughnut sugar will not adhere to a doughnut, and in consequence fine particles are present. As a criterion for satisfactory doughnut sugars, a grade is used of which 50% or more passes a standard No. 100 screen having square openings 0.149 millimeter on a side, and 10% or less passes a standard No. 50 screen having square openings 0.297 millimeter on a side. Dextrose is commercially available as its monohydrate and as its anhydrous form. These have been used each alone, or together in various proportions, to control characteristics of the sugar.

In my copending application Serial No. 626,096, filed December 4, 1956, I have described a process of disrupting the set of normally solid fat to improve its spreadability by mechanical working to impart plastic flow, in the manner characteristic of thixotropic materials. This is preferably done by whipping, and the flowable fat is hereinafter referred to as a "whip." Then the whip is mixed with the remaining solids of the doughnut sugar. The distribution of the fat on the sugar is greatly improved, and the process permits extending the conventional range for fat from 3.5% to 7.5% to 3.5% to 9%. Also the "whip" process permits using fat of one ultimate analysis as to typical fat components, to produce compositions having the same analysis but different properties.

Generally considered the fat has (1) a low-melting component, which may be edible oil, (2) a medium-melting fat, for example one melting in the range from 90° to 120° F., and (3) a fat melting in the range from 140° to 160° F., such as stearin. One or more of these fat components, as a normally solid composition, may be whipped initially, and the remainder added and then whipped in. Thus, the components are not homogenized, although each may be homogeneously distributed throughout the whip. Also, one of the fat components, preferably the liquid one, may be absent in the whip and be present as a liquid component in the final mixing, for example, mixed with the sugar prior to adding the whip, and thereby serving to oil the crystal surfaces.

Heretofore, it has been difficult to use more than 5 parts of stearin per 1000 parts of doughnut sugar, on account of the resulting high melting-point of the fat. This causes the sugar to have over-slip and also to slip off the doughnut. By using whip, the amount of stearin may be raised to 25 parts per 1000 parts of doughnut sugar without any over-slip or slipping off the doughnut. This may be done by forming an initial whip lacking in high-melting fat and then adding the latter as a melt and again whipping. A doughnut sugar so made has increased stability in the presence of heat and moisture, and is stable on water-soaked, spongy yeast-raised doughnuts.

As stated above, the manner of using the components of the fat predetermines the properties of the doughnut sugar. The ultimate fat of said three components may be of the same analytical composition and be present in the same proportion in doughnut sugars having different properties. In one case, all of the fat components may be mechanically plasticized as a single fat, giving one distinct sugar. In a different case, the normally liquid component may be absent in the whip and be present with the sugar. In still another case, the high-melting component may be absent in the initial whip of the low and medium melting components, and then the high-melting component is melted, added to the whip, and then whipped into it. In still another case, the liquid component of the fat may be first mixed with the sugar, while the medium-melting component is whipped, and then the melted high-melting component is added to the whip and then whipped into it. The greater the spread in molecular weights among the components of the fat, the greater is the decrease in viscosity by mechanically plasticizing. By increasing the content of the high-melting fat, such as the stearin, the present invention thereby effects greater plastic flow for mixing with the doughnut sugar solids.

However, the present invention may be practiced without mechanically plasticizing all or a part of the fat, and the fat may be applied in the solid, whipped, or melted state to the sugar, as heretofore practiced. The following examples illustrate the invention, and it is to be understood that the product of each example is milled to a uniform powder and bagged for use or sale.

*Example 1*

| | Parts by weight |
|---|---|
| Dextrose | 90.5 |
| Fat | 9.0 |
| Kaolin | 0.5 |

The solid fat is creamed with some of the sugar and then the remainder of the sugar is mixed with the cream. Then the kaolin is added.

*Example 2*

The following materials are used:

| | Parts by weight |
|---|---|
| Dextrose | 905 |
| Fat whip | 80 |
| Kaolin | 15 |

A body of 56 parts of medium-melting shortening (90° to 120° F.) is whipped for 5 minutes. Then 14 parts of melted stearin is added and the mass whipped for 5 minutes. Then corn oil is added and mixed in for 3 to 5 minutes. The resulting whip is then mixed with the dextrose. Then the kaolin is mixed in.

*Example 3*

| | Parts by weight |
|---|---|
| Dextrose | 950 |
| Fat | 35 |
| Kaolin | 15 |

All the ingredients except the kaolin are initially mixed and then the kaolin added.

*Example 4*

| | Parts by weight |
|---|---|
| Dextrose | 820 |
| Vegetable shortening | 70 |
| Corn starch | 110 (11%) |
| Kaolin | 5 (.5%) |
| Flavor | (As desired) |

The shortening is whipped and mixed with the sugar and starch. Then the kaolin is added, and the product is milled and bagged.

*Example 5*

| | Parts by weight |
|---|---|
| Dextrose | 820 |
| Vegetable shortening | 70 |
| Corn starch | 50 (5.3%) |
| Kaolin | 3 (.32%) |

The mixture is prepared as in Example 4.

At the minimum anti-over-slip effect, based on the information above 0.5 part of kaolin is equivalent to approximately 5 parts of starch. At the maximum anti-over-slip effect 1.5 parts of kaolin are equivalent to approximately 20 parts of starch. Since the present invention contemplates replacing all of the starch by kaolin, and also a part of the starch by kaolin, a number of mixtures of starch and kaolin is available. When the kaolin is as low as 0.3% its effect is evident. From such a content of kaolin the starch content may vary from 2% to 16%, respectively, for the minimum and maximum anti-over-slip effect. The following table indicates relative proportions.

| Percent Kaolin | Percent Starch | |
|---|---|---|
| | Minimum | Maximum |
| 0.3 | 2 | 16.0 |
| 0.4 | 1 | 14.7 |
| 0.5 | 0 | 13.3 |
| 0.75 | | 10.0 |
| 1.0 | | 6.66 |
| 1.25 | | 3.33 |
| 1.5 | | 0 |

The decrease in starch contributes to increased sweetness compared to conventional doughnut sugars compounded for anti-over-slip properties. Both the starch and the kaolin are anti-over-slip agents, and the present invention contemplates use of kaolin alone or in admixture with starch.

The dusting sugars of the present invention are useful as doughnut sugars and as toppings for cakes. As toppings the sugars are preferred to be sweeter than when dusted on doughnuts. Accordingly, the sugars of the present invention have greater utility in a bakery than have conventional doughnut sugars.

It is to be understood that the invention is not limited to or by the illustrative examples herein given, and that modifications are contemplated as falling within the scope of the invention expressed in the appended claims.

I claim:

1. A pulverulent dusting sugar comprising in uniform distribution dextrose, fat, and kaolin, the fat being present in amount in the range from 3.5% to 9%, and the kaolin being present in amount in the range from 0.3% to 1.5%, and in addition, respectively from 16% to 0% of starch, the kaolin being in particle form adhered to the fat-coated solids of the composition.

2. A pulverulent dusting sugar consisting essentially in uniform distribution of dextrose, fat, and kaolin, the fat being present in amount in the range from 3.5% to 9%, and the kaolin being present in amount in the range from 0.5% to 1.5% and being in particle form adhered to the fat-coated solids of the composition.

3. The method of making a dusting sugar containing solids selected from the group consisting of dextrose and a mixture of dextrose and starch, which comprises mixing said solids with fat in amount in the range from 3.5% to 9% of the composition, and then mixing therewith kaolin in amount in the range from .30% to 1.5% of the composition.

4. The method of making a dusting sugar which comprises mixing dextrose with fat in amount in the range from 3.5% to 9% of the composition, and then mixing therewith kaolin in amount in the range from 0.5% to 1.5%.

5. The method of making a dusting sugar having from 3.5% to 9% of fat, which comprises mixing dextrose with a normally solid portion of the fat lacking a normally liquid portion of the total fat of the dusting sugar, then mixing in said normally liquid portion, and then mixing kaolin into the mixture in amount in the range from 0.5% to 1.5% of the composition.

6. In a doughnut sugar comprising a large proportion of dextrose and a small proportion of fat, anti-over-slip material comprising a mixture of starch and kaolin, the dextrose being coated with the fat, and the kaolin being in particle form adhered to the fat-coated solids of the composition.

7. In a doughnut sugar comprising a large proportion of dextrose and a small proportion of fat, anti-over-slip material comprising a mixture of starch and kaolin, the starch being present in amount not over 16% and the kaolin being present in amount from 0.3% to 1.5% and being in particle form adhered to the fat-coated solids of the composition.

8. In a doughnut sugar comprising a large proportion of dextrose and a small proportion of fat, anti-over-slip material selected from the group consisting of kaolin and a mixture of kaolin and starch, the composition having kaolin in particle form adhered to the fat-coated solids of the composition.

9. In a doughnut sugar comprising a large proportion of dextrose and a small proportion of fat, anti-over-slip material selected from the group consisting of kaolin and a mixture of kaolin and starch, the kaolin being present in amount not over 1.5% and the starch being present in amount not over 16% of the composition, the kaolin being in particle form adhered to the fat-coated solids of the composition.

References Cited in the file of this patent

UNITED STATES PATENTS

| | | |
|---|---|---|
| 2,012,506 | Griffith | Aug. 27, 1935 |
| 2,144,371 | Griffith et al. | Jan. 17, 1939 |
| 2,739,896 | Block et al. | Mar. 27, 1956 |

FOREIGN PATENTS

| | | |
|---|---|---|
| 348,184 | Great Britain | May 8, 1931 |

OTHER REFERENCES

"The Chemical Senses," by Moncrieff, Leonard Hill, Limited, 17 Stratford Place, W. 1, London, 1944, pp. 296 and 297.